Aug. 21, 1934.　　　J. B. BRADY　　　1,970,594
ROTARY ENGINE
Original Filed Aug. 12, 1930　　5 Sheets-Sheet 2

Fig. 2.

Inventor
Jack B. Brady
By Lyon & Lyon
Attorneys

Aug. 21, 1934.  J. B. BRADY  1,970,594
ROTARY ENGINE
Original Filed Aug. 12, 1930   5 Sheets-Sheet 3

Fig. 3.

Inventor
Jack B. Brady
By Lyon & Lyon
Attorneys

Aug. 21, 1934.  J. B. BRADY  1,970,594
ROTARY ENGINE
Original Filed Aug. 12, 1930  5 Sheets-Sheet 4

Inventor
Jack B. Brady
By Lyon & Lyon
Attorneys

Aug. 21, 1934.   J. B. BRADY   1,970,594
ROTARY ENGINE
Original Filed Aug. 12, 1930   5 Sheets-Sheet 5

Inventor
Jack B. Brady
By Lyon & Lyon
Attorneys

Patented Aug. 21, 1934

1,970,594

UNITED STATES PATENT OFFICE 1,970,594

ROTARY ENGINE

Jack B. Brady, San Diego, Calif.

Application August 12, 1930, Serial No. 474,701
Renewed June 20, 1934

6 Claims. (Cl. 123—13)

My invention relates to fluid engines and has particular reference to engines of the rotary type. Fluid engines for power producing or power consuming functions have been developed along two distinct lines, namely, reciprocating types and rotary types, or a combination of the two types. The reciprocating type of engine is known to be relatively inefficient because of inherent disadvantages accruing to the two or four stroke cycle of operation and the difficulty of balancing the reciprocating elements of the engine to minimize or eliminate vibration.

The forms of rotary types of engines so far developed are for the most part not true rotary engines since they embody in their construction reciprocating or alternating motion masses which parts prevent the full realization of the advantages which should accrue to the true rotary principles.

Another object of my invention is to provide a rotary fluid engine embodying a fixed annular cylinder which may be divided into two chambers, each chamber constituting a cylinder of equal, or unequal volume, by means of two rotary abutments, both of which when closed function as dividing abutments or cylinder heads for the retention of fluid pressures exerted thereupon and both of which are operable to permit the passage of the pistons as they progressively revolve through the two cylinder chambers thus provided.

Another object of my invention is to provide a rotary fluid engine of the character set forth in the above paragraphs, in which the rotary abutment or valves are of a greater diameter than the cross sectional diameter of the annular cylinder and describe a circle in excess of the inner diameter of the annular cylinder.

Another object of my invention is to provide a rotary fluid engine in which the fluids may be forced into the piston passageway of the rotary abutments.

Another object of my invention is to provide a rotary fluid engine of the character set forth in which at least one of the rotary abutments may embody a central tubular passageway at the axis of the valve into which the fluids may be forced by the passage of the pistons through the abutment.

Another object of my invention is to provide a rotary abutment for an engine of the character described in which a central tubular passageway through the axis of the abutment constitutes a portion of the firing or expansion chamber for the fluids.

Another object of my invention is to provide a rotary engine in which a fixed annular cylinder surrounding a central shaft is traversed by a pair of substantially circular profile pistons and which annular cylinder may have a single rotary abutment or may be divided into two separate sections by two rotary abutments operating at the same speed of operation and directions as said central shaft.

My invention will be described with reference to the accompanying drawings, in which.

Figure 1:
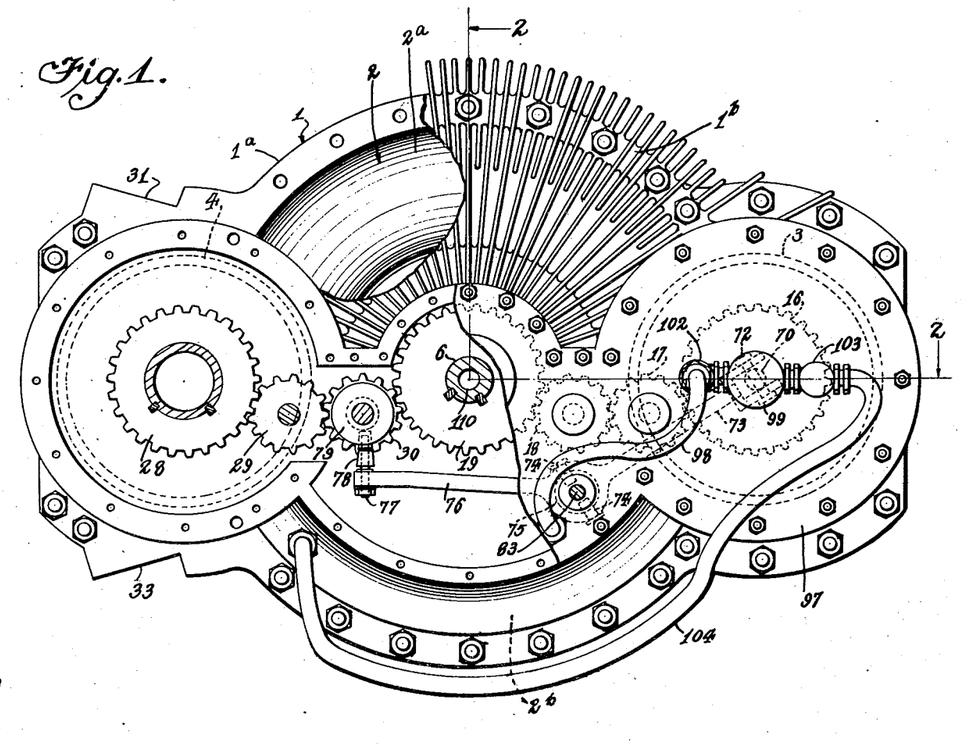
Figure 1 is an elevational end view of a motor constructed in accordance with my invention, a portion of the casing being broken away to more clearly illustrate the cylinder and rotary abutment gearing.

Referring particularly to Figure 1, I have illustrated a cylinder housing 1, as comprising a pair of complementary structures 1a and 1b, each of which forms a wall for one half of a circular annular cylinder 2 joined together on their outer circumferences by a flanged joint, which when bolted or otherwise secured together forms a fluid tight joint between the two halves of the engine so joined to prevent leakage. The right and left hand ends of the housing 1 constitute an enclosing housing for a pair of rotary abutments 3 and 4, which are employed in the embodiment shown, to divide the cylinder 2 into upper and lower sections, 2a and 2b.

Figure 2:
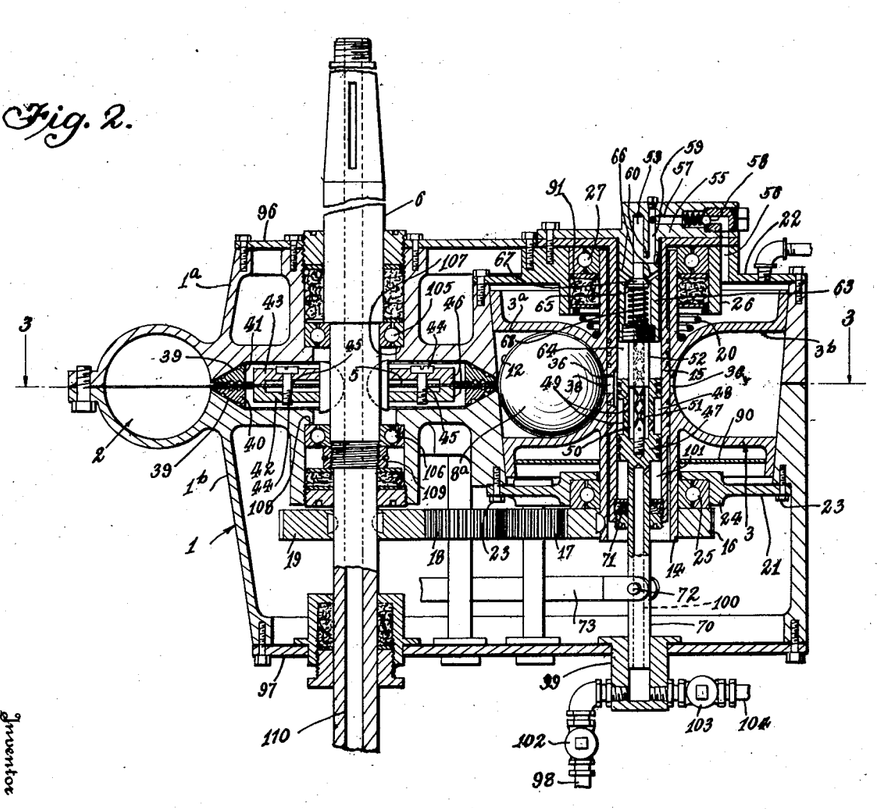
Figure 2 is a composite sectional view taken along lines 2—2 of Figure 1 showing a vertical section at the left hand side of Figure 1 and a horizontal section at the right hand side of the figure, the shaft representing the intersection of the two sections.

Referring particularly to Figure 2, it will be observed that the cylinder 2 comprises an annular chamber of circular cross section, the inner diameter of the chamber being slightly larger than the diameter of a piston carrying disc 5 which is secured to a central shaft 6 for rotation therewith.

At diametrically opposite points on the disc 5 are formed a pair of lugs 7a and 7b which extend beyond the periphery of the disc to enter a pair of pistons 8a and 8b. Each of the pistons 8a and 8b is preferably of hollow construction, as will be hereinafter pointed out, and is bored as at 9 to permit the passage therethrough of a pin 10 which enters a suitable opening 11 in the lug 7 to thereby rigidly secure the piston 8a to the disc 5.

The pistons 8a and 8b are of true circular cross section through their axes which are parallel to the axes of rotation of the shaft 6. Thus, in the direction of the motion of the piston 8, it will be of such size and configuration as to correspond to the circular configuration of the annular cylinder 2.

Figures 4, 6:
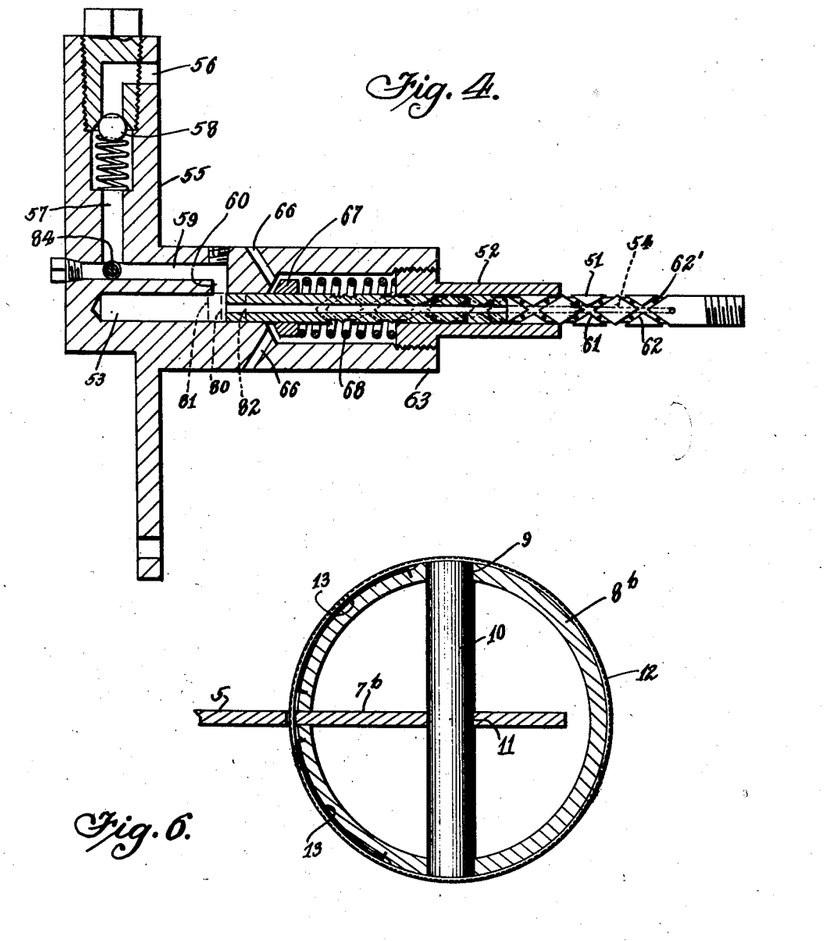
Figure 4 is a detail sectional view of the injector and/or atomizer which may be employed with my engine.
Figure 6 is a detail sectional view of one of the pistons employed in carrying out my invention.

While it is preferred that the outer dimensions of the pistons 8a and 8b shall be such as to provide substantial clearance between the pistons and the walls of the annular cylinder 2, the circular configuration of the piston permits this clearance to be packed by suitable piston rings 12 of an expansible type. It should be observed that the rings 12 will have their outer faces curved to fit the circular curvature of the walls of the annular cylinder. For convenience, the piston rings 12 may be employed to retain the pin 10 if desired, thus dispensing with the necessity of riveting or otherwise securing the pin to the piston structure.

Since the centrifugal force which will be exerted upon the packing rings 12 will be great the rings may be balanced by employment of springs 13 pressing the rings 12 toward the central shaft 6.

The foregoing construction constitutes an annular cylinder through which a pair of pistons which substantially completely fill the cross section of the cylinder at any stated period considered and in which they may be rotated.

In the embodiment of my engine illustrated herein the engine is adapted for use as an internal combustion engine and for such adaptation the division of the annular cylinder into two separate portions is accomplished by means of the pair of rotary abutments 3 and 4, each of which is illustrated as comprising a tapered abutment structure located within a tapered housing formed by the outer ends of the housing structure 1.

Figure 3:
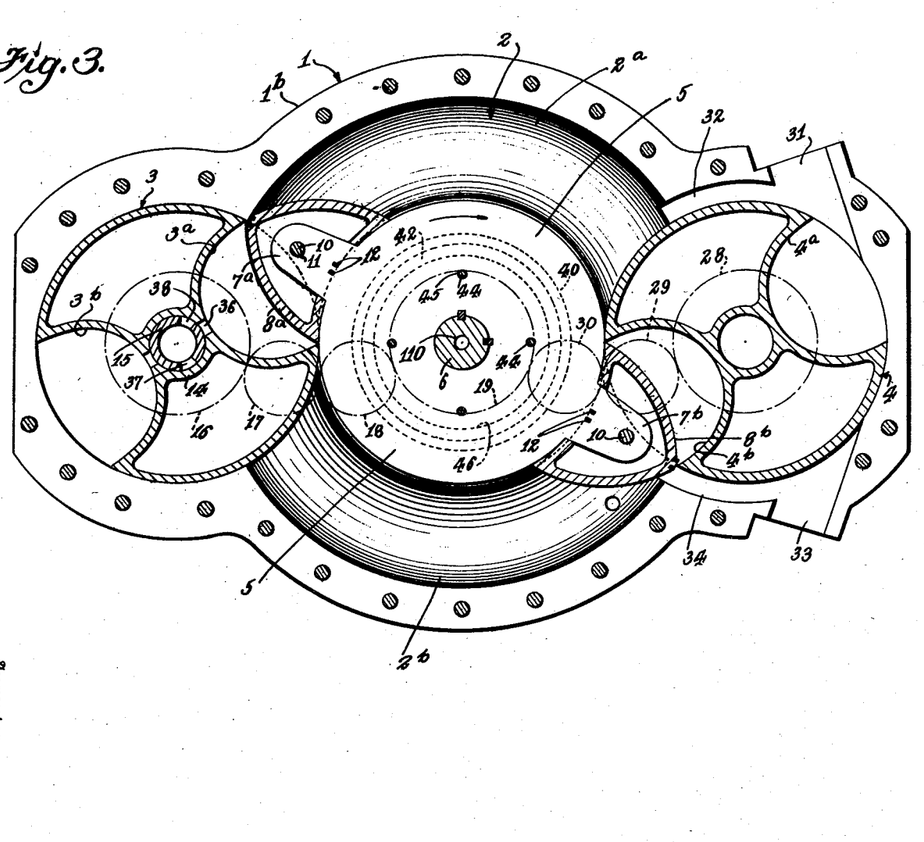
Figure 3 is a sectional view taken along line 3—3 of Figure 2 illustrating the relative arrangement of the cylinder, pistons and rotary abutment employed.

Referring particularly to Figure 3, it will be observed that the abutment 3 is substantially circular along its axis of rotation but has recessed therein a pair of piston passageways 3a and 3b which substantially envelop and allow the passage of the piston therethrough on its motion from one section of the cylinder 2 to the other. The passageway being formed upon the composite arc described by the outermost point of said piston penetrating the interior of the abutment when the piston and abutment are simultaneously rotated about their respective axes and the piston having an arcuate profile on opposite sides of the plane of its circular cross section corresponding to the composite arc described by the respective movements of the peripheral edge of the piston passageway in its movement about the axis of the abutment and the arc described by the piston in its rotation about the axis of the engine shaft.

The configuration of the piston passageways 3a and 3b and the profile of the pistons 8a and 8b along their axes in the direction of motion of the pistons are such as to constitute, in effect, intermeshing gears, the piston passageway being a female tooth lying completely within its root circle, the pistons being the male tooth formed entirely outside its root circle. Thus, the rotation of the disc 5 and pistons 8a and 8b relative to the rotation of the abutment 3 causes the pistons to enter the passageways 3a and 3b and to substantially contact with the entire inner portions of the wall of this passageway.

Since any gases which are ahead of the piston 8a prior to its entry into the passageway 3a, on the intake stroke or cycle, will be compressed to exert a relatively high pressure, provision must be made to prevent the escape of such gases between the line of contact of the abutment 3 and the inner line of the cylinder 2, and for this reason the circumference of the abutment 3 should extend slightly beyond the inner diameter of the cylinder walls.

The purpose of this overlapping of the cylinder walls and the abutment will be apparent when it is considered that due to the circular cross section of the cylinder the line of contact between the surface of the abutment and the inner diameter of the cylinder walls would be a mere point contact if these two circles were tangential to each other, but by overlapping them, as by permitting the abutment to extend beyond the inner diameter of the cylinder, a substantial area contact between the surface of the abutment and the surface of the material forming the cylinder wall is accomplished. Thus, instead of having a mere point contact which is difficult to seal against the passage of gases, a substantial area contact occurs which will effectively prevent the escape of gases from one side of the abutment to the other where the abutment intersects the cylinder wall. Moreover with this construction the abutment rolls directly upon the outer edge of the piston disc 5 to form a line contact between the disc and the abutment which is relatively small, but the surfaces of the cylinder walls on both sides of the disc form such a relatively large area contact that the abutment with the small line contact between the abutment and the disc minimizes the escape of gases during the operation of the engine between the passage of one of the pistons through the abutment and the time at which the next piston is presented to the abutment. Thus it will be observed that the outer diameter of the disc 5 is slightly less than the inner diameter of the cylinder 2, by just that amount by which the diameter of the abutment 3 exceeds or overlaps the inner wall of the cylinder 2.

The abutment 3 is preferably of hollow construction, formed with a central hollow boss 14 which acts as a hub upon which the valve 3 is mounted. The hollow boss 14 is mounted for rotation around a tubular shaft 15 which is stationarily secured, as will hereinafter be described, to the housing member 1a.

One end of the tubular boss 14 of the abutment 3 is keyed or otherwise secured to a gear 16 which is in turn connected through suitable gearing 17 and 18 to a gear 19 which is keyed or otherwise secured to the central shaft 6. The ratio of the gears 16, 17, 18 and 19 is such that the abutment 3 is rotated at exactly the same speed with which the central shaft 6 and the piston bearing disc 5 rotate. Thus, each time the piston 8a or 8b arrives in a position to enter its respective passageway 3a or 3b in the abutment 3, the abutment 3 will have been also rotated to just that position which presents the passageway ready for the entry of the piston, and the passageway will thereafter be progressively rotated in the direction in which the piston is moving to allow the piston to progressively pass through the passage. Since the abutment 3 and the disc 5 are rotated at the same speed and are in contact with each other, the diameter of the disc 5 should exactly correspond to the diameter of the abutment 3 at the point of contact therebetween, to insure that both of these parts will be moving at exactly the same peripheral speed and thus eliminate any friction or rubbing of the surfaces with the edge of the disc and the diameter of the abutment and thus, these parts have a true rolling engagement at their point of contact.

The employment of the tapered construction of the abutment 3, as just described, provides a relatively large area of contact surface between the outer walls of the abutment 3 and the tapered walls of the housing 1, and by reason of this large area of contact the seating pressure of contact required to substantially prevent escapement of gases, (even under compression) around the abutment 3, need be very slight and may be amply provided for by means of a relatively light spring 20 exerting a pressure on the abutment 3 toward the smaller end of the abutment.

To assist in supporting the abutment 3 for rotation I have illustrated a pair of bearing plates 21 and 22, the plate 21 being secured as by bolts 23 to one side of one of the housing members 1b to constitute an enclosing wall for the abutment chamber. The plate 21 may be provided with suitable bosses 24 so placed as to accommodate between them and the tubular boss 14 of the abutment 3, a suitable non-friction bearing 25. In like manner, the plate 22 is secured to the other of the housing members 1a to constitute an opposite end wall for the abutment chamber and may be provided with a boss 26 between which and the tubular boss 14 of the abutment 3 may be inserted a second non-friction bearing 27.

It should be observed that the non-friction bearings 25 and 27 are in nowise secured to the boss 14 of the abutment 3, so that the abutment 3 is at all times free to float endwise with reference to these bearings, the function of the bearings being to assist in reducing the rotational friction of the abutment 3. This additional bearing support is particularly necessary at that period of the rotation of the abutment 3 at which the abutment 3 receives a thrust from the compressed and/or expanding gases which are being forced by compression or expansion against the walls of the abutment.

The abutment 4 illustrated at the opposite side of the housing 1 is similar in construction to the abutment 3 and is geared in a similar manner as by means of gearing 28, 29 and 30 to the gear 19. The ratio of the gearing 28, 29, 30 and 19 is in like manner such as to insure the rotation of the abutment 4 in exactly the same speed with which the central shaft 6 is rotated. The abutment 4 is supported for rotation upon suitable non-friction bearings identical in arrangement with the bearings 25 and 27 described with reference to the abutment 3.

The construction thus far described may be readily adapted for use as an internal combustion engine by providing suitable inlet and exhaust ports communicating with the cylinder 2. Referring particularly to Figure 3, I have indicated on the right hand side of the upper section 2a of cylinder 2, above the abutment 4, an opening 31 through the housing 1 and communicating through a passage 32 to the interior of the upper half 2a of the annular cylinder 2. Likewise, I have illustrated an inlet port 33 communicating through a passageway 34 to the lower half 2b of the annular cylinder 2. If the central shaft 6 is to be rotated in a clockwise direction, as viewed in Figure 3, the port 33 may be employed as an intake or inlet port, while the port 31 may be employed as an exhaust port. It will be understood that the passageways 32 and 34 communicating with the interior of the cylinder 2 will be suitably shaped and constructed to prevent engagement of the piston rings 12 with the edges of the port or passageway openings.

With the construction above described the engine may be employed to function as an Otto cycle engine by connecting the inlet port 33 with a suitable source of fuel supply such as the usual carburetor employed for this purpose, and in this case, the movement of the pistons through the cylinder will first cause suction behind the retreating face of the piston which is passing through the lower half 2b of the cylinder 2, which will cause an influx of fuel and air which have been suitably mixed in the carburetor which is employed.

As the piston 8a, for example, passes into and through the abutment passage 3a, the opposite piston 8b will have been moved into such position as to substantially start its entry into the lower half 2b of the cylinder 2. Thus, the charge of fuel gases which has been drawn into the lower half 2b of the cylinder 2 will be compressed by the advancing face of the piston 8b to force these gases into the abutment passageway at relatively high compression. Thus, the lower half of the cylinder 2 is employed for the intake and compression cycles of the engine, which dual function is accomplished by using both sides of the pistons, each time they enter this chamber.

By providing the rotary abutment 3 with a port 36 communicating with the inner portion of the piston passageway 3b and providing a cooperating port 37 in the stationary tubular shaft 15, the compressed gases may pass into the interior of the tubular member 15. By arranging an igniting device within the tubing 15 or into the walls of the passageway 3b, or the walls of the annular cylinder as close to the firing end of the cylinder as possible, the charge may be fired, as by use of any of the electrical igniting devices which may be necessary to employ to furnish the electrical current necessary to furnish electricity to the igniting device.

A suitable outlet port 38 may be provided in the tubular member 15 spaced in the direction of rotation of the abutment 3 to permit the fired gases to escape back into the piston passageway 3b when the port 36, in its movement, becomes aligned with the port 38. Thus, the fired gases impinge upon the retreating face of the piston 8b as it starts out of the passageway 3b into the upper half 2a of the cylinder 2. Thus, the compressed charge is fired at such time as to produce a pressure upon the retreating face of the piston 8b and forces this piston through the upper chamber of the cylinder 2 toward the exhaust port 31.

It will be observed that by the use of an annular construction of the cylinder 2, a relatively long expansion stroke may be obtained, since the annular cylinder constitutes, in effect, the periphery of a circle the extreme limit of the expansion stroke is the arc which lies between the axis of the abutment 3 and the point of intersection of the cylinder 2 by the auxiliary valve 4, though this expansion stroke may be shortened by locating the exhaust port at any point along this arc.

The movement of the piston 8b under the influence of the expanding charge at the same time moves the piston 8a and by means of the circular disc 5 acting as a connecting link between the pistons, the opposite piston 8a will at the same period of time perform its function as a suction and compressing unit as described in the preceding paragraph, through its second passage through the lower half 2b of the cylinder 2 to compress the charge which was admitted behind the retreating face of the piston 8b and also causes the inflow of a third charge behind the retreating face of the piston 8a. As the piston 8b moves over and past the exhaust port passage 32, the exhaust gases are permitted to escape to the atmosphere and are assisted in this scavenging by the advancing face of the following piston 8a which is now being forced through the expansion chamber constituted by the upper portion of the cylinder 2 by the second charge which was or is being expanded.

In this adaptation of my engine the abutment 4 performs only the function of dividing the upper and lower halves of the cylinder 2 into separate compartments, thus functioning only as an abutment member to prevent the dilution of the fresh air or combustible charge on one side of the abutment with the expanded and exhausted gases to be discarded through the exhaust port which is present on the opposite side of this rotary abutment, there being no compression or firing accomplished at this end of the cylinder.

By suitably selecting the location of the inlet port 33 and the outlet port 31 and also by suitably locating the rotary abutment axis around the circumference of the fixed annular cylinder in the lower and upper halves of the cylinder 2, the desired compression stroke and the desired expansion stroke may be obtained to suit the best power requirements or the particular fuel for which it is to be designed to use. The latitude permitted for the length of the expansion stroke by the arrangement of the cylinder as an annulus constituting, in effect, the outer periphery of the engine proper, the expansion stroke may be carried to the complete expansion of the charge so that the exhaust is made to the atmosphere at a time when the charge is completely expanded or is substantially at atmospheric pressure. Thus, the full power of the charge may be utilized with the consequent increase of efficiency of the engine over the efficiency of engines now in general use, in which only a relatively small portion of the power of the charge is actually effectively obtainable to perform work. Moreover, permitting complete expansion of the gas of the charge and exhausting the same at substantially atmospheric pressure eliminates the noise of exhaust and renders the engine substantially silent in its operation.

The construction of an engine in accordance with the foregoing description is particularly adapted to the Diesel cycle of operation because the great length of the intake and compression strokes obtainable permits compression of gases to extremely high values and also due to the facility with which low grade fuel oil may be admitted to the engine at the proper period in the cycle where its introduction will be most effective.

The adaptation of my engine to the Diesel cycle may be accomplished by merely leaving the inlet port 33 open to the atmosphere, so that a charge of air is drawn into the lower half of the cylinder 2, behind the retreating face of the piston 8a. As the piston 8b passes into the lower half of the cylinder 2, this charge of air is compressed and forced into the piston passageway in the valve 3 from whence it passes through the port 36 into the interior of the stationary tubular sleeve valve member 37. The highly compressed air in the lower half of the cylinder 2 is effectively prevented from escape since the only points at which it could escape are first the line of contact between the inner edges 39 of the slotted cylinder wall and the periphery of the piston carrying disc 5 and the point of contact between the periphery of the rotary abutments 3 and 4 and the edge of the disc 5.

Escape of the highly compressed air between the sides 39 of the cylinder walls and the disc 5 may be effectively prevented by the employment of annular rings 40 and 41, each having a substantially wedge-shape cross section, the one face of which bears against the flat surface of the disc 5 and the other edge of which bears against the beveled face formed on the wall of the cylinder forming housing 1. These rings 40 and 41 are of the expansible split type similar to the construction employed in piston packing rings and may be secured as by means of pins and slots, not shown, to the cylinder walls so as to permit expansion of the springs but to effectively prevent rotation of the rings caused by rotation of the disc against which they bear. The wedge-shaped cross section of the rings presents substantially a knife edge toward the cylinder 2 so that effective area of the ring against which pressures created in the cylinder 2 may bear may be reduced to a minimum and will present too small an area for the expanding gases to bear upon, to enable these gases to force the rings inwardly to allow the escape of the gases under the pressure exerted; should these rings not have sufficient inherent spring pressure to effectively seal the cylinder against compression and expansion pressures, their effectiveness may be added to by the use of added auxiliary springs to assist them in performing the services of sealing the annular cylinder.

Since the inner diameter of the cylinder 2 is slightly in excess of the diameter of the disc 5 and since the diameter of the rotary abutments 3 and 4 is such as to overlap the inner diameter of the fixed annular cylinder, it will be apparent that at the point of contact between the rings 40 and 41 and the rotary abutments 3 and 4, a depression must be formed in the rings to permit this overlapping without tending to force the packing rings inwardly from their intimate contact with the immediate inner diameter of the annular cylinder walls and with the flat sides of the disc 5.

Since the pistons 8a and 8b are to be subjected to considerable great forces, the mounting disc 5 of comparatively thin cross section which carries these pistons which may be reinforced, if desired, by suitable annular rings 42 and 43 secured in any suitable manner to the central shaft 6 and extending outwardly in engagement with the disc 5. I have illustrated the reinforcing members 42 and 43 as being secured together at a plurality of points by means of bolts 44 which extend through the reinforcing members and through suitable openings 45 in the disc 5. By recessing a portion of the surfaces of the bracing members 44 which are adjacent the faces of the disc 5, the reinforcing members may be drawn tightly against the disc 5, the flanges 46 formed on the reinforcing members 44 by such recessing place the point of contact between the reinforcing members in the disc at such distances away from the axis of the disc as to be most effective in bracing the disc. These reinforcing members also provide sufficient area at their axes to provide for the securing of members 5, 42 and 43, to the central shaft.

As hereinbefore explained, the overlapping of the periphery of the rotary abutments 3 and 4 and the inner diameter of the annular cylinder permits a rolling contact between the edge of the disc 5 and the periphery of the rotary abutments 3 and 4. This rolling contact extending only across the actual width of the relatively narrow disc, presents only a minute area through which there is any possibility of escapement of the gases under pressure.

The gases under pressure which are forced by the advancing face of the piston moving through the lower half of the cylinder into the stationary tubular sleeve valve member 15 permits the injection of the fuel at the point at which it will be most effective. The injection of the fuel may be readily accomplished by providing the tubular valve 15 with a reciprocating piston 47 having two faces and having an annular passageway 48 cut therein which in turn communicates through openings 49 to an interior chamber 50 in the reciprocating valve member. Within the chamber 50 I have illustrated a stem 51 which extends and is guided through a sleeve 52 into a fuel injection chamber 53.

Referring particularly to Figure 4, it will be observed that the stem 51 is bored with a central tapered opening 54 extending along the axis of the stem 51, the outer end of the tapered bore 54 communicating with the injection chamber 53. The injection supply chamber 53 is formed at one end of a fuel supply member 55, which communicates through an opening 56, to a suitable source of fuel supply. The opening 56 in turn communicates through a passage 57 in which is located a spring-ball check valve 58. The passage 57 in turn communicates with a passage 59 having an outlet 60 communicating with the fuel injection supply chamber 53 at a point inwardly spaced along the axis of this chamber. From the construction just described it will be apparent that movement of the stem 51 into the fuel injection supply chamber 53 will force the fuel contained in the chamber 53 through the tapered bore 54 in the stem 51. Due to the employment of the check valve 58, the entry of fuel under pressure into the tapered bore 54 will occur at the instant the stem 51 starts its movement into the chamber 53.

I have illustrated the stem 51 as having cut upon the outer surface thereof a pair of spiral grooves, one extending in a right hand direction around the stem 51 and the other one extending in a left hand direction, forming in effect, a pair of grooves separated by a plurality of substantially diamond shaped projections extending above the depth of the cut.

These grooves 61 and 62 terminate at a point spaced from the end of the stem 51 toward the fuel injection chamber 53 to allow the ungrooved portion of the stem 51 to make a fuel-tight fit with the walls of the chamber 53 at a point on the opposite end to allow the securing of this stem in the reciprocating piston member 47. A plurality of orifices 62' extend between the bottom of the grooves 61 and 62 into communication with the central tapered bore 54 and the stem 51 to provide a plurality of fuel entrance openings between the tapered bore 54 and the grooves, the fuel is thus forced by the constriction of the stem 51 against the end wall of the injection chamber 53 to be ejected through the orifices 62' in the spiral grooves, 61 and 62. This ejection effect is heightened by the velocity of the compressed air passing over the orifices 62' and causing an additional vacuum or ejector effect, and also causing an effective breaking up of the globules of fuel and a thorough atomization and blending of the fuels and air to effectively take place. The orifices 62' are preferably angled toward the chamber 53 as they pass from the grooves 61, 62 to the passage bore 54.

Referring again to Figure 2, it will be observed that the stem 51 is surrounded by a stationary boss 63, the inwardly extending portion thereof being of such diameter as to allow substantial clearance between the boss 63 and the inner walls of the sleeve 15.

It will also be observed that the piston valve 47 is so arranged with respect to the opening through the sleeve 15 that a portion of the compressed air at equal pressure will pass into a chamber 64 ahead of the piston valve 47. Thus, as the piston valve 47 moves into the chamber 64, the compressed air in the chamber will be forced under additional pressure between the sleeve 15 and the boss 63 to cause this air to be injected into a whirling chamber 65 through ports 66. If desired, the ports 66 may be normally closed by a check valve 67 comprising a sleeve which is spring-pressed as by means of a spring 68.

The highly compressed air in the whirling chamber 65 thus passes horizontally around the intersecting spiral grooves 61 and 62 across the orifices communicating with the tapered bore 54. Thus, the fuel oil which is injected through the orifices is met by the whirling air under pressure and now at high velocity and is utilized and thoroughly mixed with the gases passing through the grooves. Since the grooves 61 and 62 communicate with a mixing chamber 50 in the piston valve which in turn communicates with the annular space around the piston valve 47, the injected fuel now intimately mixed with the compressed air, and at this point injected in the air under pressure remaining in the annular chamber surrounding piston valve 47, this homogeneous mixture is now undergoing spontaneous combustion due to heat of compression and fuel and is in condition to be injected through the ports 38 and 36 into the piston passageway 36.

Referring particularly to Figure 2, it will be observed that the piston valve 47 is formed with an extending portion 70 which passes through a suitable stuffing box 71 formed in the inner end of the sleeve member 15 and is connected as at 72 to a reciprocating member 73. Referring particularly to Figure 1, it will be observed that the reciprocating member 73 is in this case a lever and may be pivoted as by means of pins 74 upon a substantially ball-shape supporting member 75 beyond which an extending arm 76 of the lever 73 extends to a point of attachment 77 of a cam engaging pin 78. The cam engaging pin 78 may engage a box cam 79 secured to and rotatable with one of the gears constituting the gear train connecting the central shaft 6 with one of the valve members 3 or 4. For convenience I have illustrated the cam 79 as supported upon and rotatable with the gear 30 which, as is illustrated in Figure 1, is caused to make two complete revolutions for each revolution of the central shaft 6. In this event, the cam groove constituting the box cam will be so shaped as to cause an oscillation of the lever 73 once during each revolution of the gear 30, or, in other words, will cause two oscillations of the lever 73 for each revolution of the central shaft 6, or any other means to obtain an oscillation of piston valve member 47 may be employed that will give a positive forward and backward oscillation twice in each revolution of the central shaft 6.

The relation of the time at the beginning of the oscillation of the lever 73 with respect to the position of the piston 8b should be such that the piston valve 47 may start its inward movement approximately as soon as the valve ports 36 pass beyond the port 37, this occurring just prior to the arrival of the piston 8b at dead center, or may be advanced or retarded in its movement period by means of an adjustable member which will be described in a later paragraph.

It will thus be seen that with the construction of the injector just described, a completely mixed charge is formed within the sleeve valve 15 with the air under greatest compression and, as will be readily understood by those familiar with the Diesel cycle, this compression of air and fuel oil will cause ignition of the same to begin the firing or expansion stroke. Thence, the rotation of the central shaft 6 and the disc 5 moving the piston, for example, 8b, into the expansion chamber, will cause rotation of the abutment 3 to align the port 36 therein with the outlet port 37 and the sleeve valve member 15 and the ignited mixture will thence pass against the retreating face of the piston 18 and force the same through the expansion chamber of the cylinder 2.

The quantity of fuel which will be injected upon each stroke of the piston valve 47 and stem 51 may be readily adjusted by ajusting the position of the stem 51 relative to the port 60. For example, if the position of the stem 51 with reference to the port 60 as illustrated, with an adjustment so that the position of the stem 51 at the beginning of its inward stroke aligns the end of the stem 51 with the outer edge of the port 60, thus insuring a complete opening of the port 60 to allow ingress of fuel. Since the configuration of the box cam 79 determines the length of the stroke of the stem 51, the length of stroke is fixed. For example, with a certain size engine this stroke may be 1". The configuration of the box cam or any type of cam, eccentric or bell crank movement that may be employed may be for its length of stroke or oscillation equally or unequally divided into an arc of a circle; in other words, on the forward or injection stroke of stem 51 this movement of 1", as shown above as an example of what may be employed as a length of stroke, may be accomplished in an arc ranging from 20° to 160° if desired instead of the one-half of the arc of 180°, or one-half circle.

As the stem 51 moves inwardly into the chamber 53, the charge of fuel which has been admitted into the chamber through the port 60 will be injected into the firing chamber. On the other hand, should the stem 51 be so adjusted that at the beginning of its inward stroke it assumes a position illustrated by a dotted line 80, the orifice or port 60 will be so restricted as to admit a lesser quantity of fuel into the chamber 53 and hence a lesser quantity of fuel will be injected into the engine. If a further adjustment of the stem 51 is made so that at the beginning of its inward stroke the inner end of the stem 51 is in the position shown by the dotted line 81, the orifice 60 will not be opened by the oscillation of stem 51 on its return stroke and no fuel will be allowed to pass into the chamber 53 and hence no fuel will be injected into the engine. This illustrates the cut-off position or the position at which all fuel in the engine will be shut off and the engine thereby stopped.

On the other hand, the stem 51 may be so adjusted that at the beginning of its inward stroke is in the position shown by the dotted line 82. With this adjustment the stem 51 has not only opened the port 60 to its fullest extent but has passed beyond the port, permitting a greater lapse of time for the filling of the chamber 53 by oil flowing through the port 60 and hence, upon the inward stroke of the stem 51 a still greater or maximum charge of fuel will be injected into the engine. Thus, the adjustment of the position of the stem 51 controls the quantity of fuel which is to be injected into the engine, and also controls the time of injection to the extent that if the chamber 53 is completely filled with fuel the injection will start at the instant of starting the inward stroke of the stem 51, while if the chamber 53 is less than full the actual injection of fuel into the engine does not occur until after stem 51 has moved sufficient to compress the contents of the chamber 53 to a pressure in excess of the compressed gases in the sleeve member 15, which automatically will be at a period later than that period illustrated in the first half of this paragraph.

Figure 7:
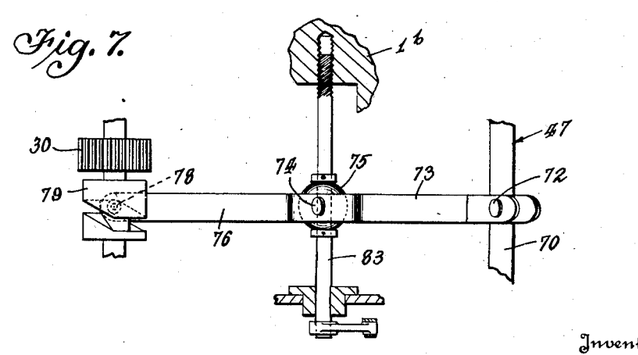
Figure 7 is a detail view of the lever and cam assembly employed to operate the fuel injector illustrated in Figures 2 and 4.

The adjustment of the position of the stem 51 at the beginning of its inward stroke, may be readily accomplished by mounting the bearing member 75 as indicated in Figure 7 upon a suitable adjusting device whereby the bearing 75 may be moved inwardly and outwardly in a direction parallel to the movement of the piston valve 47. This adjustment is illustrated as by mounting the bearing member 75 upon a threaded shaft member 83, a portion of which extends through the housing cover plate 1b to constitute a stem which, when rotated, acting in a manner similar to a screw and nut adjustment will move the bearing member through the desired amount of adjustment, thus forcing injector stem 51 inwardly or outwardly in relation to port 60 for the beginning of its fixed length of stroke.

While I have illustrated but a single port 60 as communicating with the fuel injection chamber 53, it will be apparent that a plurality of such ports may be arranged spaced in the direction of movement of the stem 51 provided the innermost port shall be in such position as to be completely covered by the stem 51 when the stem 51 is at the rear of its stroke or suction position and in its innermost adjusted position, to thus provide for the shutting off of fuel by adjustment of the position of stem 51. The size and number of these ports may be properly selected, so that, with any given adjustment of the stem 51 a predetermined quantity of fuel will be injected into the engine upon each stroke of the stem 51, by the retreating plunger end of stem 51 uncovering a definite number of these ports for the purpose of metering the quantity of fuel desired to inject into the engine.

Figure 5:
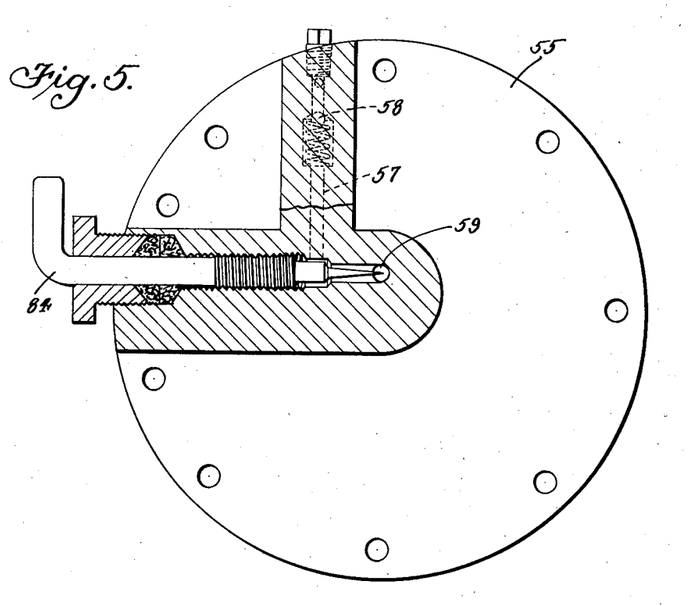
Figure 5 is a detail sectional view of an adjusting or regulating needle valve which may be employed to regulate the flow of fuel into the injector.

Also an adjustable tapered needle valve 84 may be provided in the passageway 57 to restrict the passageway 59 to any desired opening to further assist in regulating the quantity of fuel which will be passed into the chamber 53 upon each stroke of the stem 51.

Due to the hollow construction of the abutments 3 and 4 the interior portion thereof may be employed when using lower grade fuel oils as a fuel oil reservoir which will permit the oil so contained to be warmed to the temperature of the abutment 3 and at the same time will act to cool the abutment 3.

The hollow abutment 3 may be provided near the lower portion thereof with a plate 90 welded to the boss 14 and to the outer periphery of the abutment 3 to effectively seal the interior or the upper portion of the abutment, (as viewed in Figure 2) from the remainder of the housing 1. The opposite end of the abutment 3 may be enclosed by the plate 22, which forms a fuel oil chamber of relatively large dimensions completely surrounding the abutment 3. The oil contained therein may be prevented from escape past the bearings 27 by suitable packing 91 held in compression by the abutment seating spring 20. The fuel inlet passage 56 may communicate with the fuel oil chamber so formed.

Since the entire pressure under which the fuel oil is to be introduced into the engine is created by the reciprocating piston 47 and its associated parts, there is no necessity of applying any extraneous pressure to the oil in the oil chamber formed around the abutment 3. Hence, the pressure exerted by the spring of the check valve 58 need only be slightly in excess of the pressure of the oil contained within the chamber surrounding the abutment 3. It will be apparent that the return stroke of the stem 51 receding from the oil injection chamber 53 will create a suction as soon as it opens the port 60, or plurality of ports, as described. This suction will be more than sufficient to permit the opening of the valve 58 to allow an additional supply of fuel to pass into the chamber 13.

Moreover, when the engine is shut off the check valve 58 will effectively seal the injection chamber 53 so as to prevent an accumulation of an oil charge in the hollow stem 51 during the time the engine is stopped, thus providing a safety factor preventing too great a charge being injected into the engine upon the initial starting thereof, and preventing the carbonization of oil and the consequent clogging of the orifices in the stem 51 which would occur if the fuel oil were allowed to remain in contact with the heated plunger and valve structure.

The compact construction of the housing members 1, cylinder 2 and central shaft 6 provides for ready lubrication of all of the moving parts of my engine by enclosing the sides of the housing 1 and 1a with cover plates 96 and 97, respectively, thus enclosing a compartment surrounding the shaft 6 and the various employed gears 17, 18, etc. which compartment may be filled with lubricating oil. This oil lying against the outer plates 96 and 97 which may be ribbed for greater heat radiation and strength which plates and ribbing will assist in cooling the oil used for lubricating purposes.

The cylinder 2 may be lubricated by means of a force feeding lubrication of any suitable character, though I may accomplish this force lubrication by providing an oil line 98 which communicates with the lowermost part of the outer oil chambers formed by the end plates 96 and 97. The oil line 98 communicates with a bearing 99 in which the extending stem 70 of the piston valve 47 operates. By boring the central opening 100 through the stem of the extension 70 and communicating this passage to an oil pumping chamber 101 formed in between gland 71 and the back of the piston valve 47, the extending stem 70 may constitute a lubricating pump.

For example, by inserting in the pipe line 98 a check valve 102 in advance of the entry of this line into the bearing 99 and a check valve 103 in a second section 104 of the pipe line leading from the bearing 99, the reciprocating motion of the piston 47 and its extending stem 70 will cause suction of oil into the chamber 101, while the return stroke of the piston will force the oil out through the pipe line 104. The pipe line 104 communicates with the lower half of the cylinder 2 at a point adjacent the inlet port 33. By providing a suitable adjustment on the pipe line leading to the cylinders a desired quantity of oil may be injected into the cylinders on each stroke of the piston valve 47. It will be noted that each and every moving unit or part in the entire motor is amply lubricated by moving and/or rotating in a body of oil, except the pistons in the annular cylinder, which may be lubricated by the method above described.

By referring particularly to Figure 2 it will be observed that the central shaft 6 is supported for rotation upon suitable non-friction bearings 105 and 106 located respectively on opposite sides of the transverse axis of the cylinder 2. The bearings 105 and 106 are retained in suitable bearing members formed upon the respective housing halves 1a and 1b upon which are formed suitable shoulders 107 and 108, respectively, limiting inward movement of the non-friction bearings 105 and 106. With this construction the amount of expansion permitted the cylinder 2 may be effectively limited by providing a shoulder 109 on the shaft 6 bearing against the outer side of the bearing 106. The weakest portion of the cylinder 2 being represented by the slot therein along its inner diameter through which the piston lugs pass allows pressures and heat expanding tendencies which are built up in the cylinder 2 to tend to further increase the width of the slot in the cylinder walls, but as hereinbefore pointed out, the amount of expansion permitted in the slot is effectively limited by the foregoing construction of the shoulders on the shaft 6 and its bearing support shoulders 107 and 108.

For certain applications to which my engine may be adapted, it may be desired to construct the central shaft 6 with a central opening 110 therethrough to permit the passage of various devices which it may be found desirable to pass through the shaft 6. The type of construction of engine herein set forth is particularly adapted to such hollow shaft construction since the shaft 6 may be made of any diameter, limited only by the inner diameter of the cylinder 2, with of course, sufficient allowance being made for rigidity of construction of the walls of the inner diameter of the annular cylinder and the packing rings 40 and 41 bearing against these walls and disc 5. As will hereinafter be pointed out, the hollow shaft construction is particularly adapted for aeronautical use, permitting the central shaft opening 110 to be used for the passage of an airplane propeller controlling device or to permit gun fire through the central passage 110 and the axial space constituting the hollow propeller hub mounted thereon.

I have hereinbefore described the application of my engine to internal combustion uses employing the Otto cycle. It will be observed that with the construction described using two rotatable abutments and the two pistons operating through the annular cylinder 2, will act to produce the same number of power impulses per revolution as will a four-cylinder cycle Otto cycle engine. In other words, for each revolution of the central shaft 6, two-power impulses will be given to the shaft, one for each of the pistons 8a and 8b as they progressively pass through the expansion cylinder. It will be further observed that my engine has the added advantage that there is no dead stroke in any part of the cycle of operations, there being a power impulse produced during each half revolution of shaft 6. This effect results from the fact that the movement of either of the pistons through the lower half of the cylinder 2 constitutes two portions of the cycle occurring simultaneously, namely, the compression stroke ahead of the advancing face of the piston and an intake stroke behind the retreating face of the piston, while the passage of either of the pistons through the upper half of the cylinder also achieves the result of simultaneous occurrence of two portions of the cycle, namely the expansion and exhaust strokes, the expansion stroke occurring against the retreating face of the piston, while the exhaust stroke occurs ahead of the advancing face of the piston.

My engine is also adaptable to the Diesel cycle, as hereinbefore pointed out, and of course, is equally as well adapted to the semi-Diesel cycle in which the initial starting of the engine may be performed by providing an igniting device in the firing chamber formed within the sleeve member 15, the walls of the rotatable abutment 3, or the walls of the annular cylinder 2, which may be employed for the first few revolutions of the engine until the heat of the engine becomes sufficiently great to cause automatic ignition of the fuel. The location of the intake port 33 with reference to the abutment 3 may be adjusted to suitably select the desired compression of air which is to be employed in the desired cycle of operations, and the fuel for which the design permits. My engine is thus well adapted for use on the cycles in common usage today, namely, the Otto cycle, the low pressure oil engine, the semi-Diessel or the full Diesel cycle of operation.

From the foregoing description it will be apparent that numerous advantages accrue from the construction of an engine of the type herein described, the outstanding advantage of this engine being the necessity for employing relatively few parts as compared with the reciprocating types of engines now in general use. With the exception of the injector parts, the engine is composed entirely of a housing member constituting the annular cylinder, a central shaft, a pair of pistons and a disc connecting them to the central shaft and a pair of rotary abutments, all of which are arranged for rotary motion having none of the disadvantages encountered in reversing the direction of moving masses such as are normally found in reciprocating engines.

Another advantage of my engine is in the fact that it permits of a compact construction, owing to the natural and symmetrical grouping of the various units employed.

Moreover, the total length of the engine in the direction of the axis of the central shaft is relatively small, being only slightly in excess of the dimensions sufficient to properly house the axial length of the abutments 3 and 4 and the gearing which connects them for rotation with the central shaft 6. From a constructional standpoint it will be noted that the crank shaft and cam shaft systems constituting an expensive and complicated mechanism with inherent disadvantages are entirely lacking in my engine, and are replaced with a simple straight line shaft, piston disc and pistons of simple form of rotatable construction. The rotary abutments, the shaft disc and pistons (one unit when secured together) adapt themselves in an admirable manner to perfect static and dynamic balancing, and thus an exceptionally well balanced unit, as well as a consequently well balanced entity is secured in the running of my engine.

Another advantage of the construction described particularly with reference to the injector structure set forth, is that the possibility of clogging or filling tendency of the orifices of the injector by carbonized fuel oil resulting from fuel remaining in the injector after the engine is stopped may be limited. The cutting off of the fuel injection by adjusting the injector piston 51 so that it does not open the port 60 on the rearward or suction stroke of injector piston 51 insures that no further fuel will be injected into the injection chamber 53, while the effect of the compressed gases blowing over the orifices 63 will insure the complete expulsion of fuel oil from the interior bore or passageway 54 by causing an ejector effect on the orifices 63, thus the orifices 63 and the grooves 61 and 62 are swept clean of fuels counteracting a tendency of fuel to carbonize and clog the orifices 63.

A further advantage of my engine is with reference to the fuel consumption and weight per unit of power produced thereby, since, as hereinbefore explained, the annular construction of the cylinder 2 permits the full expansion of the fuel and gases to be effectively used upon the piston, thus utilizing in full the power producing values of the particular fuel which may be employed.

Furthermore, the construction of the engine herein described is relatively cheap to manufacture, primarily because of the relative few parts which are employed and the greatly relatively lessened possibility of breakage and wear and particularly by virtue of the fact that the cylinder 2 may be comprised of two complementary structures permitting ready access for the machining of the surfaces which require such treatment and also permitting ready assembly of the engine.

The adaptation of my engine to aeronautical uses is particularly advantageous, first by virtue of the small overall dimensions of the engine per unit of power capable of being derived therefrom, presenting not only smaller surfaces for parasitic air resistance but also obviating the present vision difficulty by permitting the pilot to have a complete range of vision unobstructed by an engine though such engine may be mounted directly in front of the pilot's position.

Moreover, the hollow construction of the central shaft 6 permitted with the construction of the engine herein described permits of machine gun fire directly through the engine and the axis of the airplane propeller hub thus eliminating the necessity for synchronizing devices to synchronize the machine gun fire with the rotation of the propeller as has been necessary heretofore. Also, propeller control such as an adjusting device for adjusting the pitch of the propeller blades for various necessities of flying may be readily arranged by passing such adjusting device through the space within the hollow shaft 6.

It will be noted that the pistons in their complete rotary motion through the annular cylinder will give full and complete scavenging effect of the compartment forming the expansion cylinder, and by the use of large sized intake ports a practically full volumetric filling of the cylinder acting as a compression cylinder. It will be noted that I do not limit myself to any particular location in the periphery of the annular cylinder in which to place the rotary abutments, which when closed act as abutments or cylinder heads, thus by the shifting at the time of design of the location of one abutment, the intake stroke may be lengthened and the expansion stroke simultaneously shortened, thus the volumetric capacity of the intake cylinder being now larger in volume than the expansion cylinder the compressed charge of air will act as a supercharger to the expansion cylinder, or inversely the expansion stroke may be lengthened and the intake stroke thereby shortened by the reverse method above outlined.

I claim:

1. A rotary fluid engine including a central shaft, a substantially circular cross section cylinder constituting a continuous annulus concentric with said shaft, a piston secured to said central shaft and operating through said cylinder in a continuous direction, a rotary abutment having its axis parallel to the central shaft and outside said cylinder and having a piston passageway therethrough of such configuration as to interfit with said piston during relative rotary motion therebetween to effectively bar passage of fluids around said piston, a chamber in said abutment at its axis communicating with said passageway for receiving fluids from the advancing face of the pistons, and a fuel injector in said chamber for injecting fuel into said compressed fluids.

2. A rotary fluid engine including a central shaft, a substantially circular cross section cylinder constituting a continuous annulus concentric with said shaft, a piston secured to said central shaft and operating through said cylinder in a continuous direction, a rotary abutment having its axis parallel to the central shaft and outside said cylinder and having a piston passageway therethrough of such configuration as to interfit with said piston during relative rotary motion therebetween to effectively bar passage of fluids around said piston, a hollow hub on said abutment having a port therethrough communicating with said passageway, a stationary sleeve about which said hub rotates constituting a chamber for receiving fluids from said passageway, and having a pair of ports therein respectively alignable with the said abutment port when said piston is passing into said passageway and when said piston is passing out of said passageway, whereby said abutment chamber acts as a firing chamber for said fluids and acts to pass the fluids from the advancing face of the piston to the retreating face thereof as said piston passes said abutment, a chamber in said abutment communicating with said passageway for receiving fluids from the advancing face of said piston, and a valve in said chamber for permitting said fluids to pass back into said passageway as said piston starts out of the passageway.

3. A rotary fluid engine including a central shaft, a substantially circular cross section cylinder constituting a continuous annulus concentric with said shaft, a piston secured to said central shaft and operating through said cylinder in a continuous direction, a rotary abutment having its axis parallel to the central shaft and outside said cylinder and having a piston passageway therethrough of such configuration as to interfit with said piston during relative rotary motion therebetween to effectively bar passage of fluids around said piston, a hollow hub on said abutment having a port therethrough communicating with said passageway, a stationary sleeve about which said hub rotates constituting a chamber for receiving fluids from said passageway, and having a pair of ports therein respectively alignable with the said abutment port when said piston is passing into said passageway and when said piston is passing out of said passageway, whereby said abutment chamber acts as a firing chamber for said fluids and acts to pass the fluids from the advancing face of the piston to the retreating face thereof as said piston passes said abutment, a chamber in said abutment communicating with said passageway for receiving fluids from the advancing face of said piston, a valve in said chamber for permitting said fluids to pass back into said passageway as said piston starts out of the passageway, an injector pump in said chamber for injecting fuel under pressure into said chamber, and means connecting said pump to said central shaft for timed driving relation with respect to the position of said pistons and said abutment.

4. A rotary fluid engine including a central shaft, a substantially circular cross section cylinder constituting a continuous annulus concentric with said shaft, a piston secured to said central shaft and operating through said cylinder in a continuous direction, a rotary abutment having its axis parallel to the central shaft and outside said cylinder and having a piston passageway therethrough of such configuration as to interfit with said piston during relative rotary motion therebetween to effectively bar passage of fluids around said piston, a hollow hub on said abutment having a port therethrough communicating with said passageway, a stationary sleeve about which said hub rotates constituting a chamber for receiving fluids from said passageway, and having a pair of ports therein respectively alignable with the said abutment port when said piston is passing into said passageway and when said piston is passing out of said passageway, whereby said abutment chamber acts as a firing chamber for said fluids and acts to pass the fluids from the advancing face of the piston to the retreating face thereof as said piston passes said abutment, a chamber in said abutment communicating with said passageway for receiving fluids from the advancing face of said piston, a valve in said chamber for permitting said fluids to pass back into said passageway as said piston starts out of the passageway, a reciprocating pump in said chamber for injecting fuel under pressure to said chamber, and means for adjustably connecting said injector to said central shaft for adjustable timed relation with respect to the position of the pistons and said abutment.

5. A rotary fluid engine including a central shaft, a substantially circular cross section cylinder constituting a continuous annulus concentric with said shaft, a piston secured to said central shaft and operating through said cylinder in a continuous direction, a rotary abutment having its axis parallel to the central shaft and outside said cylinder and having a piston passageway therethrough of such configuration as to interfit with said piston during relative rotary motion therebetween to effectively bar passage of fluids around said piston, a chamber in said abutment at its axis communicating with said passageway for receiving fluids from the advancing face of the piston, and a fuel injector in said chamber for injecting fuel into said compressed fluids, said rotary abutment being hollow and having a passageway therefrom communicating with said injector adapting the abutment to the storage of fuel supply in intimate contact with the heated portions of said engine to act as a preheater for the fuel.

6. A rotary fluid engine including a central shaft, a substantialy circular cross section cylinder constituting a continuous annulus concentric with said shaft, one or more pistons secured to said central shaft and operating through said cylinder in a continuous direction, a rotary abutment having its axis parallel to the central shaft and outside said cylinder and having a piston passageway therethrough of such configuration as to interfit with said piston during relative rotary motion therebetween to effectively bar passage of fluids around said piston, a hollow hub on said abutment having a port therethrough communicating with said passageway, a stationary sleeve about which said hub rotates constituting a chamber for receiving fluids from said passageway, and having a pair of ports therein respectively alignable with the said abutment port when said piston is passing into said passageway and when said piston is passing out of said passageway, whereby said abutment chamber acts as a firing chamber for said fluids and acts to pass the fluids from the advancing face of the piston to the retreating face thereof as said piston passes said abutment, a chamber in said abutment communicating with said passageway for receiving fluids from the advancing face of said piston, a valve in said chamber for permitting said fluids to pass back into said passageway as said piston starts out of the passageway, an injector pump in said chamber, means connecting said pump to said central shaft for timed driving relation with respect to the position of said pistons and said abutment, and means on said injector pump for pumping lubricant into said cylinder.

JACK B. BRADY.